Patented May 7, 1929.

1,712,365

UNITED STATES PATENT OFFICE.

NORBERT STEIGER, OF FRANKFORT-ON-THE-MAIN, AND ERWIN HOFFA AND HANS HEYNA, OF HOCHST-ON-THE-MAIN, GERMANY, ASSIGNORS TO GRASSELLI DYESTUFF CORPORATION, OF NEW YORK, N. Y., A CORPORATION OF DELAWARE.

ORTHO-CARBOXYAMIDOARYLTHIOGLYCOLIC ACID AND PROCESS OF MAKING SAME.

No Drawing. Application filed March 30, 1928, Serial No. 266,110, and in Germany March 31, 1927.

We have found that the reduction of ortho-cyanaryl-sulfochlorides of the general formula:

wherein aryl means a substituted arylresidue, can be carried out in such a manner, that the sulfochloride-group is reduced to the mercapto group, whereas simultaneously the cyano-group is converted into the carboxyamidogroup $CONH_2$. The ortho-carboxyamidoarylmercaptans thus obtained of the general formula:

yield when condensed in the usual manner with monochloroacetic-acid in an alkaline solution ortho-carboxyamidoarylthioglycolic-acids of the general formula:

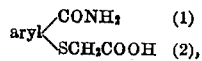

aryl meaning in both formulas a substituted aryl residue.

It is an essential feature of our process that during the whole process of reduction practically no nitrogen of the cyano-group is split off in form of ammonia, as otherwise substances, namely mostly the corresponding ortho-carboxyarylthioglycolic-acids, are formed, which we do not claim herein.

One can obtain this result by working under conditions hereinafter specified:

The cyanarylsulfochlorides are preferably dissolved in or diluted with a suitable organic solvent of an inert character such as benzene, chlorobenzene. As reducing agents zinc-dust, stannous chloride or finely powdered iron may be used with addition of either strong mineral or organic acids. Particularly well adapted for our process is strong hydrochloric-acid. Among the organic acids especially glacial acetic-acid, strong formic acid and naphthalene-mono- and -polysulfonic-acids as for instance obtained by sulfonation of naphthalene give a favourable result.

Probably as intermediates of the reduction process sulfonic-acid compounds are formed.

The ortho-cyanarylsulfochlorides which are used as starting materials for our process may be prepared by converting the corresponding ortho-aminoarylsulfonic-acids according to Sandmeyer's reaction into the ortho-cyanarylsulfonic-acids and treating the latter compounds with phosphorus-pentachloride or an excess of chlorosulfonic acid.

The new ortho-carboxyamidoarylthioglycolic acids obtainable according to our process in a very pure state with a good yield are important intermediates for the production of dyestuffs of the thioindigo-series especially when corresponding to the general formula:

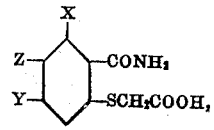

wherein X means hydrogen or an alkylgroup, Y hydrogen or halogen or an alkylgroup and Z hydrogen or halogen.

In order to further illustrate our invention the following examples are given, the parts being by weight and all temperatures in centigrade degrees; but we wish it to be understood that our invention is not limited to the examples given nor to the exact conditions stated therein.

*Example 1.*

According to the above mentioned process the 1-methyl-2-amino-5-chlorobenzene-3-sulfonic-acid obtainable by treating 5-chlorotoluidine-sulfate according to the so called baking process is converted according to Sandmeyer's reaction into the 1-methyl-2-cyan-5-chlorobenzene-3-sulfonic acid and this latter compound is treated with phosphorous pentachloride or an excess of chlorosulfonic acid.

35 parts of 1-methyl-2-cyan-5-chlorobenzene-3-sulfochloride of 74–75° melting point of the formula:

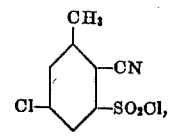

thus obtained, are dissolved in about 100 parts of benzene and at ordinary temperature slowly 20 parts of zinc dust are added, the temperature increasing to about 60°. After stirring for about an hour at this temperature the mass is cooled down and at about 35° 100 parts of hydrochloric acid (d=1,19) and again 20 parts of zinc-dust are slowly added. The mass is stirred at ordinary temperature for some hours. The reaction is finished when a test shows that the well known mercaptan-reaction (namely a yellow coloration with lead acetate) does not increase any more. Care should be taken, that during the whole process of reduction practically no nitrogen of the cyano-group is split off in form of ammonia. This can be ascertained in the following manner: a test of the reduction-mass is taken from time to time and is diluted with water, the organic residue is filtered off, the filtrate is made alkaline and boiled. Only traces of ammonia should be ascertainable in these tests.

When the reduction is finished the benzene is distilled off and the residue is diluted with water and filtered off. The mercapto-compound thus formed of the probable constitution of an 1-methyl-2-carboxyamido-5-chlorobenzene-3-mercaptan can directly be used for further technical purposes. It is without being purified mixed with about 300 parts of water and dissolved by addition of about 40 parts of a caustic soda solution of 33° Bé. and 10 parts of monochloroacetic acid are added. The condensation takes place at ordinary temperatures and is finished in a relatively short time. For precipitating the free acid the mass is acidified preferably with addition of the same volume of a common salt solution. The 1-methyl-2-carboxyamido-5-chlorobenzene-3-thioglycolic acid of the formula:

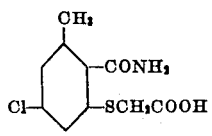

thus separates as white crystals. When recrystallized from water it represents almost colorless needles melting at 172–174°.

Example 2.

25 parts of 1-methyl-2-cyan-5-chlorobenzene-3-sulfochloride are dissolved in about 50 parts of benzene and well mixed at ordinary temperatures with 25 parts of zinc-dust. After stirring for about two hours at this temperature the mass is heated to boiling and is kept for some hours while boiling. At about 80° gradually about 50 parts of glacial acetic-acid are added and while well stirring the mass is kept at about 80° for some hours. Then it is diluted with about 1000 parts of water, filtered and the residue is repeatedly digested with a dilute caustic soda-solution. To the united filtrates of a feebly alkaline reaction at ordinary temperature a solution of 15 parts of monochloroacetic acid in 250 parts of water is added, which has been neutralized with a caustic soda solution. The isolation of the 1-methyl-2-carboxyamido-5-chlorobenzene-3-thioglycolic-acid thus formed is carried out as described in Example 1. It is identical with the product described in this example.

Example 3.

When starting from 25 parts of 1-methyl-2-cyan-6-chlorobenzene-3-sulfochloride of 74–75° melting point and otherwise carrying out the process as described in Example 2 the 1-methyl-6-chloro-2-carboxyamidobenzene-3-thioglycolic-acid is obtained. It corresponds probably to the formula:

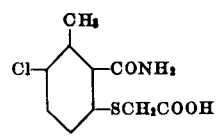

It represents a colorless crystalline powder of similar properties as the isomeric product described in the foregoing examples.

The 1-methyl-2-cyan-6-chlorobenzene-3-sulfochloride of the formula:

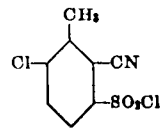

use as starting material can be obtained in the above described manner by starting from the 1-methyl-2-amino-6-chlorobenzene-3-sulfonic-acid.

We claim:

1. As new compounds ortho-carboxyamidoarylthioglycolic acids of the general formula:

wherein aryl means a substituted arylresidue, which products are crystalline substances having a definite melting point and being soluble in organic solvents.

2. As new compounds ortho-carboxyamidoarylthioglycolic acids of the general formula:

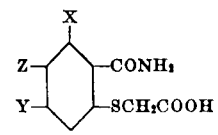

wherein X means hydrogen or an alkyl-group, Y hydrogen or halogen or an alkoxy-group, Z hydrogen or halogen at least one member of the group consisting of X, Y and Z being a substituent, which products are crystalline substances having a definite melting point and being soluble in organic solvents.

3. As a new compound the 1-methyl-5-chlorobenzene-2-carboxyamido-3-thioglycolic-acid of the formula:

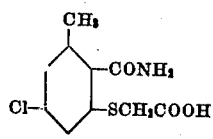

being when dry a white crystalline powder, easily soluble in organic solvents, soluble in hot water, crystallizing in almost colorless needles and melting at 172–174°.

4. The process which comprises treating an ortho-cyanaryl-sulfochloride of the general formula:

$$\text{aryl}\begin{cases} \text{CN} & (1) \\ \text{SO}_2\text{Cl} & (2) \end{cases}$$

wherein aryl means a substituted aryl residue, with a metallic reducing agent and an acid hydrolyzing agent, in the presence of an organic solvent for the cyanaryl-sulfochloride and condensing the reaction product thus obtained in an alkaline solution with monochloroacetic acid.

5. The process which comprises treating an ortho-cyanaryl-sulfochloride of the general formula:

$$\text{aryl}\begin{cases} \text{CN} & (1) \\ \text{SO}_2\text{Cl} & (2) \end{cases}$$

wherein aryl means a substituted aryl residue, with a metallic reducing agent and an acid hydrolizing agent at temperatures below 100° in the presence of an organic solvent for the cyanaryl-sulfochloride, without splitting off any substantial amount of the nitrogen of the cyano group in the form of ammonia, and condensing the reaction product thus obtained in an alkaline solution with monochloroacetic acid.

6. The process which comprises treating an ortho-cyanaryl-sulfochloride of the general formula:

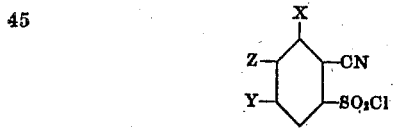

wherein X means hydrogen or an alkyl group, Y hydrogen or halogen or an alkyl group, Z hydrogen or halogen, at least one member of the group consisting of X, Y and Z being a substituent, with a metallic reducing agent and an acid hydrolyzing agent at temperatures below 100° in the presence of an indifferent organic solvent for the cyanaryl-sulfochloride, without splitting off any substantial amount of the nitrogen of the cyano group in the form of ammonia, and condensing the reaction product thus obtained in an alkaline solution with monochloro acetic acid.

7. The process which comprises treating an ortho-cyanaryl-sulfochloride of the general formula:

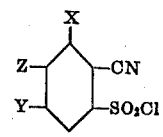

wherein X means hydrogen or an alkyl group, Y hydrogen or halogen or an alkyl group, Z hydrogen or halogen, at least one member of the group consisting of X, Y and Z being a substituent, with zinc dust and hydrochloric acid at temperatures below 100° in the presence of an indifferent organic solvent for the cyan-sulfochloride, without splitting off any substantial amount of the nitrogen of the cyano group in the form of ammonia, and condensing the reaction product thus obtained in an alkaline solution with monochloro-acetic acid.

8. The process which comprises treating 1-methyl-2-cyan-5-chlorobenzene-3-sulfochloride with zinc dust and hydrochloric acid at temperatures below 100° in the presence of an indifferent organic solvent for the cyan-sulfochloride, without splitting off any substantial amount of the nitrogen of the cyano group in the form of ammonia, and condensing the reaction product thus obtained in an alkaline solution with monochloro-acetic acid.

9. The process which comprises treating 35 parts of 1-methyl-2-cyan-5-chlorobenzene-3-sulfochloride dissolved in 100 parts of benzene with 40 parts of zinc dust at temperatures ranging from room temperature to about 60° with addition of 100 parts of hydrochloric acid (density 1.19), without splitting off any substantial amount of the nitrogen of the cyano group in the form of ammonia, and condensing at ordinary temperature the mercapto compound thus formed with 10 parts of monochloro-acetic acid with addition of 40 parts of a caustic soda solution of 33° Bé.

In testimony whereof, we affix our signatures.

NORBERT STEIGER.
ERWIN HOFFA.
HANS HEYNA.